United States Patent [19]
Smith et al.

[11] Patent Number: 5,315,681
[45] Date of Patent: May 24, 1994

[54] DETECTOR CARD STRAIN RELIEF ASSEMBLY

[75] Inventors: Dale Smith, Baltimore; Greg Behrmann, Columbia, both of Md.; Greg Ronan, Palo Alto, Calif.

[73] Assignee: The United States of America as represented by the Secretary of the Army, Washington, D.C.

[21] Appl. No.: 39,736

[22] Filed: Mar. 30, 1993

[51] Int. Cl.5 .............................. G02B 6/36
[52] U.S. Cl. ...................... 385/89; 385/86; 385/136
[58] Field of Search ........... 385/14, 53, 69, 86, 385/88, 89, 100, 101, 134-137, 139; 439/43, 55, 59-62, 449, 452, 456, 460-463, 577

[56] References Cited

U.S. PATENT DOCUMENTS

| | | | |
|---|---|---|---|
| 4,448,474 | 5/1984 | Melnychenko | 439/462 |
| 4,776,803 | 10/1988 | Pretchel et al. | 439/59 |
| 5,115,260 | 5/1992 | Hayward et al. | 385/100 |
| 5,247,603 | 9/1993 | Vidacovich et al. | 385/135 |

OTHER PUBLICATIONS

Publication: Heyco Liquid Tight Pigtail Fittings, Heyco Molded Products, Inc., Box 160, Kenilworth, N.J. 07033 undated.

*Primary Examiner*—John D. Lee
*Attorney, Agent, or Firm*—Saul Elbaum; Frank J. Dynda

[57] ABSTRACT

A detector card strain relief system for use with a fiber optic detector system is disclosed in which a detector card/strain relief brace is permanently fixed to the detector card for receiving a plurality of optical fibers exiting from a like plurality of detector cans. The plurality of optical fibers pass through two strain reliefs which are connected to either end of a monocoil. Each of the strain reliefs is connected respectively to the detector card/strain relief brace and a fiber termination mount such that the termination mount cannot be moved without moving the detector cans and, thus, the optical fibers are protected from pulling away from the detector cans while at the same time allowing for proper cooling of the detector cans and minimizing light leaking from the optical fibers. Alternate embodiments for the detector strain relief brace are provided such that the optical fibers may exit from the bottom or the side of the detector card.

20 Claims, 3 Drawing Sheets

DETECTOR CARD STRAIN RELIEF ASSEMBLY

RIGHTS OF THE GOVERNMENT

The invention described herein may be manufactured, used and licensed by or for the United States Government for governmental purposes without the payment to me of any royalty thereon.

BACKGROUND OF THE INVENTION

The present invention is directed to a strain relief system for use with a detector card which carries a plurality of detector cans to which are attached optical fibers. More particularly, the present invention relates to a strain relief system for securing each optical fiber pigtailed into a detector can mounted on a PC board such that the optical fibers are prevented from breaking, are maintained in their proper position and such that proper cooling is allowed of the protector cans.

In fiber optic detection systems, it is typical to utilize a plurality of detector cans which are mounted on a PC board or similar mounting material. An optical fiber is pigtailed into each detector can and is precisely positioned over a photodiode. Movement of the detector card, for example, while handling the card during its installation, can result in the pulling away of the optical fibers from the detector cans. That results in the misalignment of the pulled-away fiber with its photodiode, causing a degradation of the measurement capability of the fiber optic detection system. Worse, it is possible that the movement of the detector card could result in the pulling out of one or more optical fibers from their respective cans, or the breaking or bending of the optical fibers. Obviously, such conditions would severely degrade the operation of the fiber optic detection system using such a damaged detector card.

There is presently no known strain relief system which is designed to work with multi-can detector cards that utilize pigtailed optical fibers. While a similar detector card has been used by Lockheed Aircraft Services Company, no strain relief was designed or utilized. As a result, many of the optical fibers utilized with the Lockheed detector cards snapped or pulled away from their detector cans during handling of the cards. Also, although strain relief fittings are available from Heyco Molded Products Company, Inc. of Kenilworth, N.J. and monocoils were known for the protection of fiber optic cables, they have not previously been used in connection with a detector card strain relief system for providing protection as well as strain relief for a detector card such as that described above used in a fiber optic detection system.

The present invention is therefore directed primarily to the protection of the optical fibers which are pigtailed into respective detector cans on a detector card such that they are precisely positioned over a photodiode. The present invention eliminates the danger of the optical fibers pulling away from or out of the detector can during handling by keeping the optical fibers stationary with respect to the detector cans. Thus, using the present invention, a detector card can be moved without having to worry about moving the optical fibers along with it. The inventive assembly moves both of them at the same time. In addition, the protective monocoil, which is a flexible wire wrap covered with vinyl, keeps the fibers from getting crushed or snapped in half during movement of the card, or otherwise.

The present invention also allows for the cooling of the detector cans during operation of the fiber optic detector system of which the detector card forms a part. This is an important feature since the difference in temperature between all of the cans must be within one degree Celsius in order to maintain uniform performance. Since the instant detector card strain relief assembly is designed to keep the optical fibers in line with their respective detector cans, air is allowed to smoothly pass between the fibers and effectively cool the plurality of detector cans.

The detector card strain relief system of the present invention is also designed to keep the optical fibers straight as they enter their respective detector cans. That not only reduces strain, but keeps light from breaking out of the optical fibers. If an optical fiber is bent too much, the fiber will not be able to support the additional modes that will develop. Thus, the energy in those modes will leak out of the optical fiber with the result that a reduced amount of light will enter the detector and an erroneous signal will be measured. The optical fibers are more suspectable to such leakage at the detector cans since the fibers are rigidly attached to the cans and a kink can develop there more easily.

SUMMARY AND OBJECTS OF THE INVENTION

In view of the foregoing, it should be apparent that there still exists a need in the art for a method of an apparatus for preventing damage to optical fibers which are attached to detector cans by means of pigtails in assemblies in which a plurality of detector cans are mounted to PC boards. It is, therefore, a primary object of this invention to provide a method and apparatus for preventing damage to optical fibers used with detector cans mounted to a PC board which forms part of a fiber optic detection system which is characterized by a simple and easily assembled strain relief system and which has particular application for detector cards containing a plurality of detector cans such as those used in a fiber optic detection system.

More particularly, it is an object of this invention to provide for a strain relief system which is designed to eliminate the danger of the optical fibers pulling away from or pulling out of the detector cans into which each is pigtailed during handling of the detector card to which the detector cans are mounted.

Still more particularly, it is an object of this invention to provide a strain relief system which maintains each of the optical fibers straight as they enter each respective detector can for the purpose of reducing strain as well as keeping light from leaking out of each of the optical fibers.

Another object of the present invention is to provide a reliable and relatively inexpensive detector card strain relief system for use with fiber optic detector systems in which one or more detector cards which include a plurality of detector cans mounted thereon are utilized.

Briefly described, these and other objects of the invention are accomplished in accordance with its apparatus aspects by providing a card strain relief brace which is attached to the detector card. The detector card is designed to carry a plurality of detector cans into which a plurality of optical fibers is respectively pigtailed for permanent attachment in alignment with a photodiode. A strain relief such as that manufactured by Heyco Molded Products, Inc. is mounted to the brace and each of the optical fibers exiting from the pigtails passes through the strain relief. A monocoil is attached by means of clamps to the other end of the strain relief. A second strain relief is mounted at the other end of the monocoil, in the same manner as the first strain relief. The optical fibers thus pass through the first strain relief, the monocoil and then the second strain relief and are then attached to, for example, a fiber optic connector distribution assembly to which the second strain relief is mounted.

Alternate card/strain relief structures are disclosed which attach to different portions of the detector cards.

With these and other objects, advantages and features of the invention may become hereinafter apparent, the nature of the invention may be more clearly understood by reference to the following detailed description of the invention, the appended claims and to the several drawings attached herein.

DETAILED DESCRIPTION OF THE PREFERRED EMBODIMENT

Figure 1:
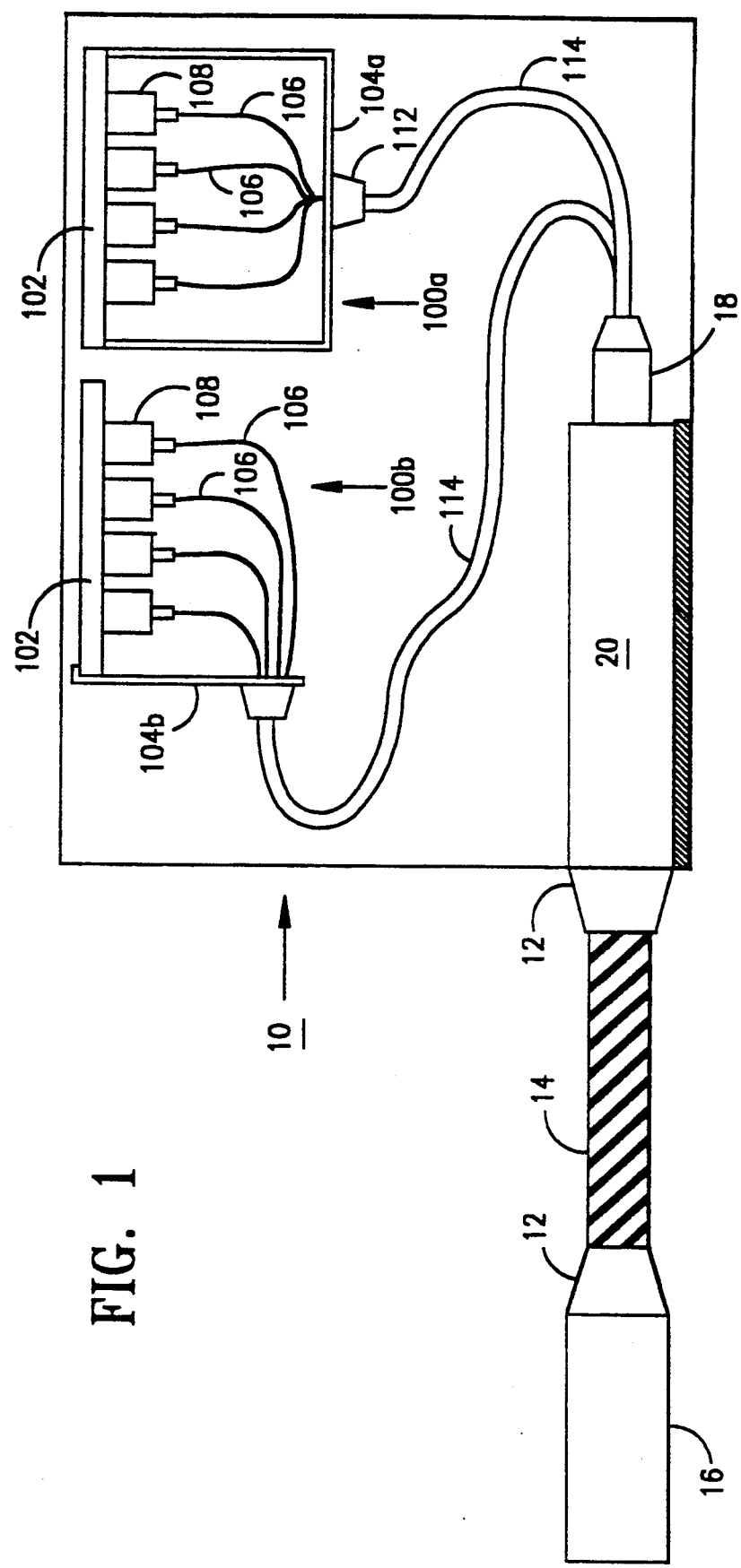
FIG. 1 is a schematic pictorial diagram of a fiber optic detection system which utilizes the detector card strain relief system of the present invention.

Referring now in detail to the drawings wherein like parts are designated by like reference numerals throughout, there is illustrated in FIG. 1 a fiber optic detector system which includes a preferred detector card strain relief system 100a and an alternate embodiment of the inventive detector card strain relief system 100b. The detector card strain relief systems 100a and 100b are described in more detail in connection with FIGS. 2-5.

The plurality of optical fibers 106 which are attached to a like plurality of detector cans 108 used in connection with the detector card strain relief systems 100a and 100b are fed into respective strain reliefs 112 associated with each detector card strain relief systems 100a and 100b. A monocoil 114 is connected to the other end of each strain relief 112 and forms a protective member for the optical fibers 106 which enter each strain relief 112. Each strain relief 112 may be a strain relief available from Heyco Moulded Products, Inc. of Kenilworth, N.J. Other strain reliefs available from other manufacturers may also be utilized.

All of the optical fibers protected by the monocoils 114 then enter a fiber optic termination mount 18 which is connected to a fiber optic connector distribution assembly 20. The optical fibers exiting from the fiber optic connector distribution assembly 20 pass through a first strain relief 12, a monocoil 14 and then a second strain relief 12 until they reach a focal plane array mount 16. Each of the strain reliefs 12 may be a Heyco strain relief as discussed above, or other suitable strain relief.

Figure 2:
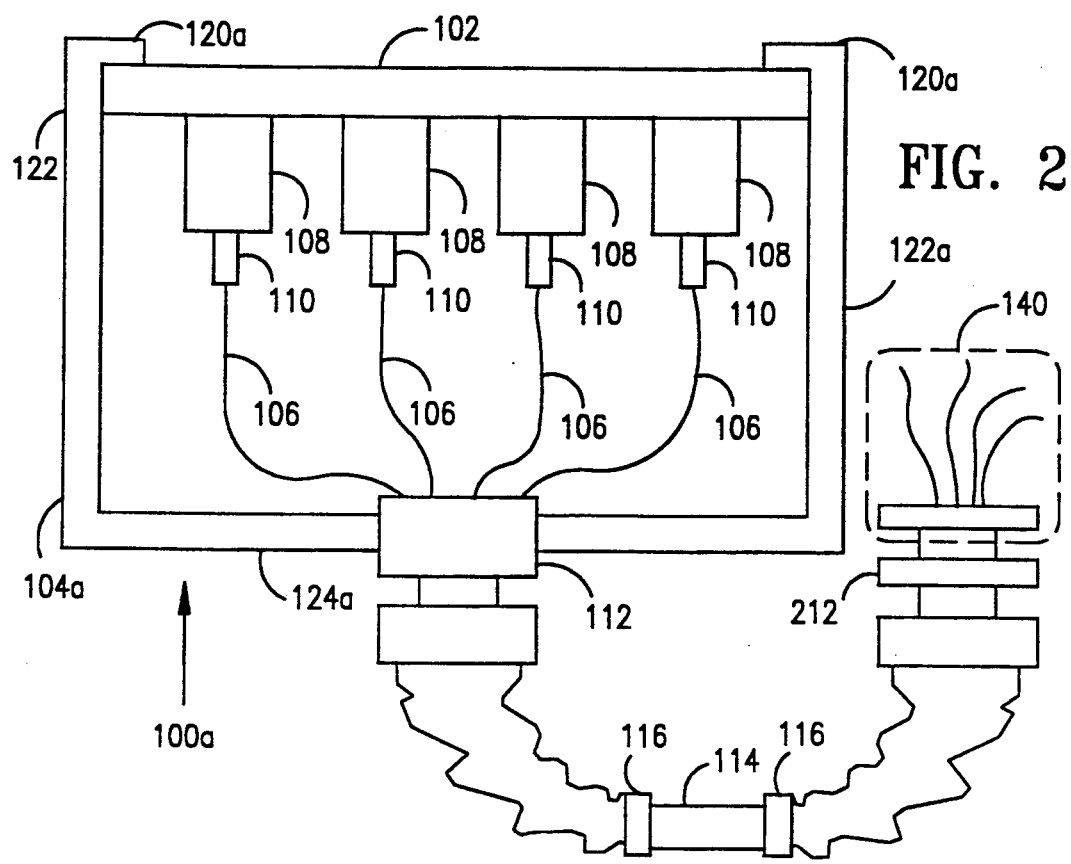
FIG. 2 is a schematic pictorial diagram of a side view of a first embodiment of the detector card strain relief system of the present invention.

Turning now to FIG. 2, there is shown the preferred embodiment of the detector card strain relief system of the present invention. A detector card 102 contains a plurality of detector cans 108, each of which includes a photodiode (not shown). A respective optical fiber 106 is centered in front of each respective photodiode in each respective detector can 108 by means of a pigtail connector 110 which serves to fix each optical fiber 106 to each respective detector can 108. The pigtail fitting 110 may preferably be a Heyco liquid type pigtail fitting part no. 3251, available from Heyco Molding Products, Inc. A U-shaped bracket 104a may be affixed to the top of the detector card 102 by any suitable means, such as, for example, by screws or adhesive material. The U-shaped card strain relief brace 104a may be formed with an arm 120a at the top of each U-portion 122 that may be used for fixing the detector card 102 to the strain relief brace 104a. The brace 104a may be made from any suitable rigid material, such as any metal or other material which can be formed into an appropriate shape.

After the card/strain relief brace 104a is attached to the detector card 102, the end of each of the plurality of optical fibers 106 which is not permanently attached to each respective detector can 108 is fed through the monocoil 114. The strain reliefs 112 and 212 are then slid over respective ends of the monocoil 114. A first strain relief 112 is tightened over the end of the monocoil 114 closest to the card brace 104a while a second strain relief 212 is tightened over the opposite end of the monocoil 114. Clamps 116 are used to tighten the strain reliefs 112 and 212 to each end of the monocoil 114. After the strain reliefs 112 and 212 are secured to the monocoil 114 by means of the clamps 116, the strain reliefs 112 and 212 and the monocoil 114 form a single rigid assembly.

The strain relief 112 is then secured in a U-shaped opening 118 formed in the middle of the bottom section 124a of the card/strain relief brace 104a. Therefore, the fiber termination mount 140 to which the second strain relief 212 is mounted, the Heyco strain relief 112, the monocoil 114, the card/strain relief brace 104a, the detector cans 108, the detector card 102 and the optical fibers 106 become one assembly. With the exception of the flexibility of the monocoil 114, the termination mount 140 cannot be moved without moving the detector cans 108.

As will be obvious to those of ordinary skill in the art, the length of the optical fibers 106 and/or the dimensions of the card/strain relief brace 104a can be adjusted to ensure that the optical fibers 106 exit from the detector cans 108 in a straight manner. Such a construction allows for the proper cooling of the detector cans 108 while at the same time minimizing light leakage from the optical fibers 106. In addition, the optical fibers 106 are protected by the monocoil 114 from being crushed or snapped in half.

Figure 3:
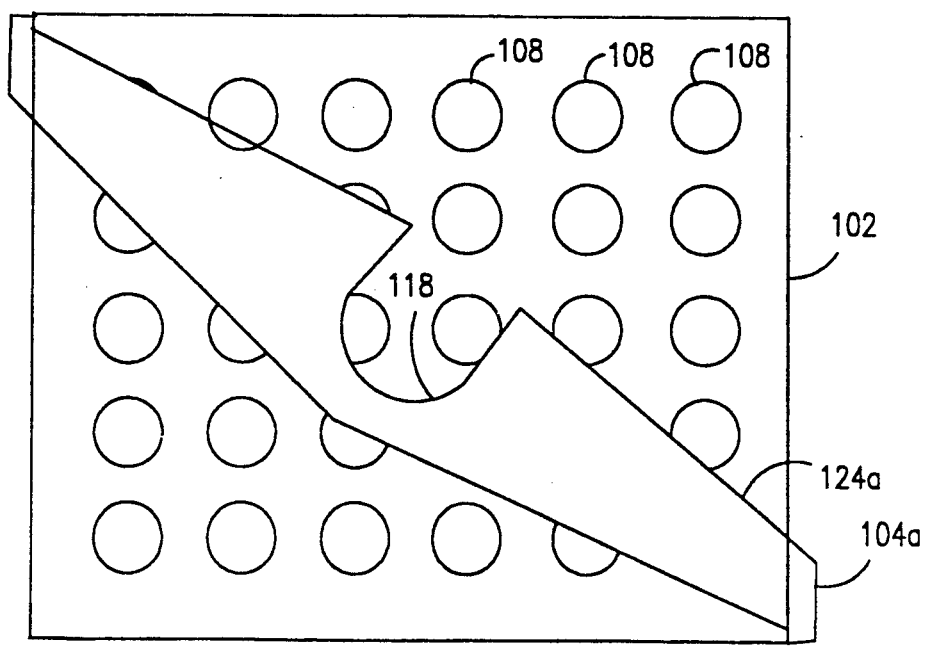
FIG. 3 is a schematic pictorial diagram of a bottom view of the first embodiment of the detector card strain relief system of FIG. 2.

FIG. 3 is a bottom view of the card/strain relief brace 104a showing the location of the U-shaped hole 118 in which the first strain relief 112 is mounted. As will be obvious to those of ordinary skill in the art, the dimensions of the card/strain relief brace 104a may readily be varied as long as the brace retains enough rigidity to ensure that the detector card strain relief system functions as described above. The detector card strain relief system 100a is designed to allow the optical fibers to exit from the bottom of the detector card 102 and thus the card/strain relief brace 104a is designed to secure the first strain relief 112 at the center of the bottom of the detector card 102.

Figure 4:
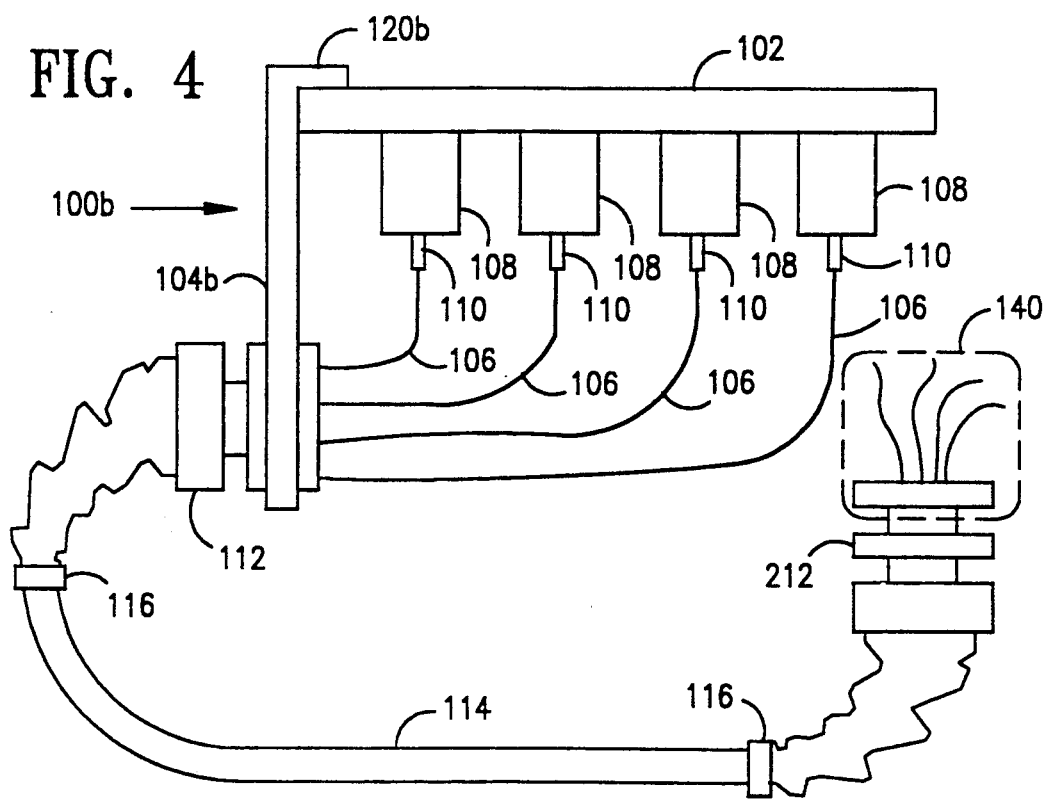
FIG. 4 is a schematic pictorial diagram of a side view of a second embodiment of the detector card strain relief system of the present invention.
Figure 5:
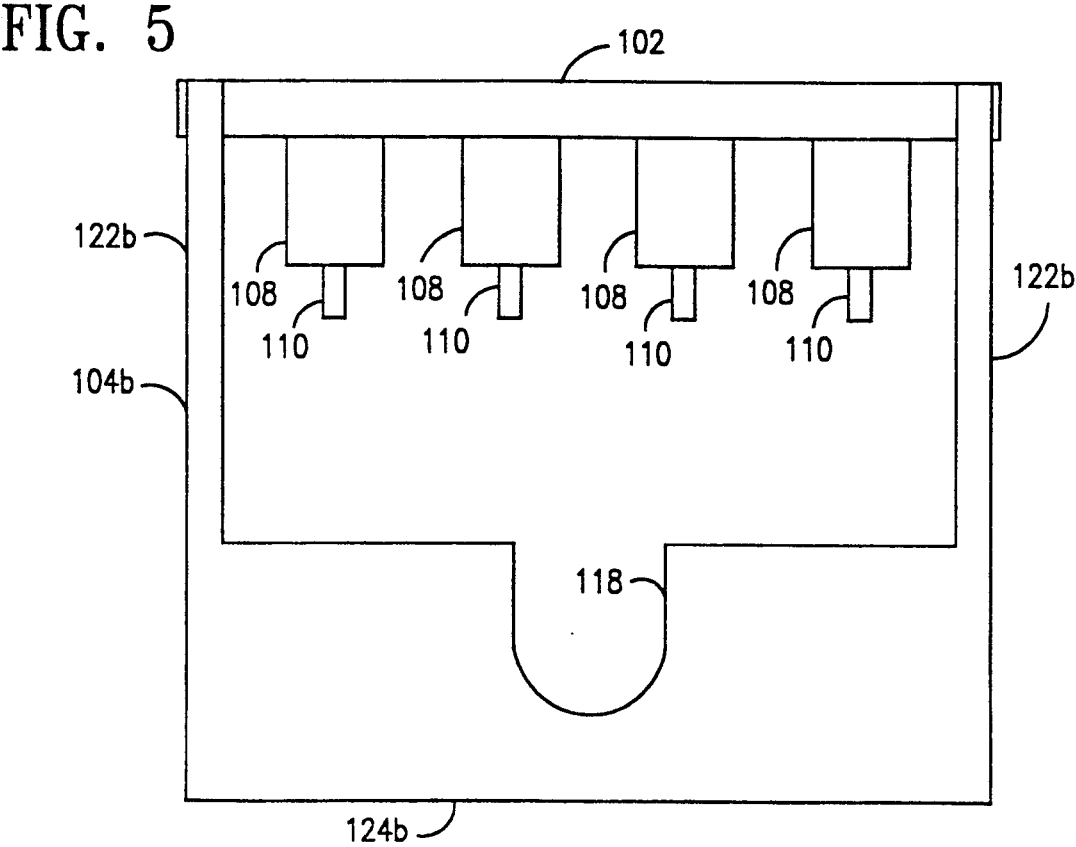
FIG. 5 is a schematic pictorial diagram of a side view of the detector card strain relief system of FIG. 4.

An alternate embodiment of the present invention which allows the optical fibers 106 to exit from the side of the detector card 102 is shown in FIGS. 4 and 5. The detector card strain relief system 100b shown in FIGS. 4 and 5 utilizes a card/strain relief brace 104b which is mounted to one side of the detector card 102a by means of two arms 122b, each of which has a perpendicular finger portion 120b which is screwed or otherwise attached to the top surface of the detector card 102.

The bottom portion 124b of the card/strain relief brace 104b is wider than the bottom portion 124a of the preferred card/strain relief brace 104a shown in FIGS. 2 and 3. It does, however, utilize the same U-shaped hole 118 to which the first strain relief 112 is secured. In all other respects, as indicated by the same reference numerals utilized in FIGS. 4 and 5 as those used in FIGS. 2 and 3, the alternate detector card strain relief system 100b shown in FIGS. 4 and 5 is constructed in the same manner as the preferred detector card strain relief system 100a.

Although only a preferred embodiment is typically illustrated and described herein, it will be appreciated that many modifications and variations of the present invention are possible in light of the above teachings and within the purview of the appended claims without departing from the spirit and intended milieux of the invention.

What is claimed is:

1. An optical detector card strain relief system for use with an optical detector card having a plurality of optical detector cans secured thereto, comprising:
   a plurality of optical fibers each secured at a first end to one of said plurality of optical detector cans by suitable securing means;
   a brace member secured to said optical detector card and extending away from said optical detector card; and
   strain relief means attached at a first end to said brace member and at a second end to a fiber optic termination mount;
   whereby a second end of each of said plurality of optical fibers passes through said strain relief means to reach said fiber optic termination mount such that said plurality of optical fibers is protected from damage by said optical detector card strain relief system.

2. The optical detector card strain relief system of claim 1, wherein said brace member is secured to opposite ends of said optical detector card such that said plurality of optical fibers exit said brace member perpendicular to the plane of said optical detector card.

3. The optical detector card strain relief system of claim 1, wherein said brace member is secured to one end of said optical detector card such that said plurality of optical fibers exit said brace member at a side of said optical detector card.

4. The optical detector card strain relief system of claim 1, wherein said strain relief means is comprised of a monocoil having a strain relief member coupled to each of its ends to form a semi-rigid strain relief system.

5. The optical detector card strain relief system of claim 1, wherein said suitable securing means which secures each of said plurality of optical fibers in its respective one of said plurality of optical detector cans is a pigtail fitting.

6. The optical detector card strain relief system of claim 1, wherein said brace member and strain relief means assure that each of said plurality of optical fibers exits from each one of said plurality of optical detector cans in a direction perpendicular to the plane of said optical detector card.

7. A method for providing an optical detector card strain relief system for an optical detector card having a plurality of optical detector cans secured thereto, comprising the steps of:
   securing one end of each of a plurality of optical fibers to a respective one of a like plurality of optical detector cans;
   mounting a brace member to said optical detector card such that it extends away from said optical detector card;
   passing a second end of each of said plurality of optical fibers through a strain relief means for protecting said plurality of optical fibers from damage; and
   mounting a first end of said strain relief means to said brace member and a second end of said strain relief means to a fiber optic termination mount;
   such that said strain relief means and brace member function to permit movement of said fiber optic termination mount only with movement of said detector cans.

8. The method of claim 7, wherein said brace member is secured to opposite ends of said optical detector card such that said plurality of optical fibers exit said brace member perpendicular to the plane of said optical detector card.

9. The method of claim 7, wherein said brace member is secured to one end of said optical detector card such that said plurality of optical fibers exit said brace member at a side of said optical detector card.

10. The method of claim 7, wherein said strain relief means is comprised of a monocoil having a strain relief member coupled to each of its ends to form a semi-rigid strain relief system.

11. The method of claim 7, wherein said one end of each of said plurality of optical fibers is secured to each respective one of said plurality of optical detector cans by a pigtail fitting.

12. The method of claim 7, further including the step of adjusting each one of said plurality of optical fibers at said brace member such that each one of said plurality of optical fibers exits such respective one of said plurality of optical detector cans in a direction perpendicular to the plane of said optical detector card.

13. A fiber optic detector system which employs at least one optical detector card strain relief system for use with at least one optical detector card having a plurality of optical detector cans secured thereto, comprising:
   at least one optical detector card;
   a plurality of optical fibers connected one said fiber to one said can of said plurality of optical detector cans;
   a brace member secured to and extending in a direction away from said optical detector card;
   a first strain relief means attached at a first end to said brace member and at a second end to a fiber optic termination mount;
   a fiber optic connector distribution means which receives said fiber optic termination mount; and
   a second strain relief means connected at one end to said fiber optic connector distribution means and at a second end to a focal plane array mount.

14. The fiber optic system of claim 13, wherein said brace member is secured to opposite ends of said optical detector card such that said plurality of optical fibers connected to said plurality of optical detector cans exit said brace member perpendicular to the plane of said optical detector card.

15. The fiber optic detector system of claim 13, wherein said brace member is secured to one end of said optical detector card such that said plurality of optical fibers exit said brace member at a side of said optical detector card.

16. The fiber optic detector system of claim 13, wherein each of said first and second strain relief means is comprised of a monocoil having a strain relief member coupled to each of its ends to form a semi-rigid strain relief system.

17. The fiber optic detector system of claim 13, wherein each of said plurality of optical detector cans has one end of each of a plurality of optical fibers secured to it.

18. The fiber optic detector system of claim 17, wherein said brace member and said first strain relief means ensure that each of said plurality of optical fibers exits from each one of said plurality of optical detector cans in a direction perpendicular to the plane of said at least one optical detector card.

19. The fiber optic detector system of claim 17, wherein said one end of said plurality of optical fibers is secured to each respective one of said plurality of optical detector cans by a pigtail fitting.

20. The fiber optic detector system of claim 13, wherein said second strain relief means ensures that optical fibers connecting said fiber optic connector distribution means with said focal plane array mount remain undamaged by movement between said fiber optic connector distribution means and said focal plane array mount of said fiber optic detector system.

* * * * *